United States Patent
Anchan et al.

(10) Patent No.: US 12,129,975 B1
(45) Date of Patent: Oct. 29, 2024

(54) APPARATUS WITH ACCELEROMETER

(71) Applicant: Rivian IP Holdings, LLC, Irvine, CA (US)

(72) Inventors: Abishek Sadhu Anchan, Irvine, CA (US); Fong Shyr Yang, Irvine, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/441,081

(22) Filed: Feb. 14, 2024

(51) Int. Cl.
| | |
|---|---|
| *F21L 4/08* | (2006.01) |
| *B60Q 3/59* | (2017.01) |
| *B60Q 3/88* | (2017.01) |
| *B60R 7/04* | (2006.01) |
| *H05B 1/02* | (2006.01) |
| *H05B 47/115* | (2020.01) |
| *B60R 11/00* | (2006.01) |
| *F21W 107/10* | (2018.01) |

(52) U.S. Cl.
CPC .............. *F21L 4/085* (2013.01); *B60Q 3/59* (2017.02); *B60Q 3/88* (2017.02); *B60R 7/046* (2013.01); *H05B 1/0202* (2013.01); *H05B 1/0236* (2013.01); *H05B 47/115* (2020.01); *B60R 11/00* (2013.01); *B60R 2011/0021* (2013.01); *B60R 2011/0047* (2013.01); *F21W 2107/10* (2018.01); *H05B 2203/03* (2013.01)

(58) Field of Classification Search
CPC ... F21L 4/085; B60Q 3/59; B60Q 3/88; B60R 7/046

See application file for complete search history.

(56) References Cited

U.S. PATENT DOCUMENTS

| | | | |
|---|---|---|---|
| 9,363,860 B1 * | 6/2016 | Lowchareonkul | H05B 45/20 |
| 2022/0234224 A1 * | 7/2022 | Glesser | H02J 50/001 |
| 2023/0034903 A1 | 2/2023 | Frederickson et al. | |

* cited by examiner

*Primary Examiner* — Joseph L Williams
(74) *Attorney, Agent, or Firm* — Foley & Lardner LLP

(57) ABSTRACT

A device can include a body including a sensor and an accelerometer. The sensor can detect contact with the body. The accelerometer can detect a movement of the body. The device can also include at least one processor. The at least one processor can determine an action corresponding to the movement of the body. The action can include at least one of a thermal effect, a production of light, or a transmission of power. The at least one processor can also cause the device to perform the action.

20 Claims, 16 Drawing Sheets

US 12,129,975 B1

APPARATUS WITH ACCELEROMETER

INTRODUCTION

Handheld devices can be powered by electric storage devices.

SUMMARY

This disclosure is generally related to one or more components of a handheld device. The components can include at least one sensor, at least one accelerometer, at least one body, at least one element, and at least one data processing system. The sensor and the accelerometer with communicate with the data processing system. The data processing system can control the element based on communication with the sensor and the accelerometer. For example, the element can include a thermal element (e.g., a heating element or a cooling element) and the data processing system can control the thermal element to provide a heating or cooling effect. As another example, the element can include a light source and the data processing system can control the light source to produce light.

At least one aspect is directed to a device. The device can include a body. The body can include a sensor and an accelerometer. The sensor can detect contact with the body. The accelerometer can detect a movement pattern of the body. The device can also include at least one processor. The at least one processor can determine an action corresponding to the movement pattern of the body. The action can include at least one of a thermal effect, a production of light, or a transmission of power. The at least one processor can also cause the device to perform the action.

At least one aspect is directed to at least one processor and memory. The at least one processor and memory can be in communication with a sensor of a body and an accelerometer of the body. The at least one processor and memory can determine, from the sensor, a first indication of a detection of contact with the body. The at least one processor and memory can also receive, from the accelerometer, a second indication of a detection of a movement pattern of the body. The at least one processor and memory can also determine an action corresponding to the movement pattern of the body. The action can include at least one of a thermal effect, a production of light, or a transmission of power. The at least one processor and memory can also cause the device to perform the action.

At least one aspect is directed to a method. The method can include detecting, by a sensory of a device, contact with a body of the device. The method can also include detecting, by an accelerometer of the device, a movement pattern of the body. The method can also include determining, by at least one processor, an action corresponding to the movement pattern of the body. The action can include at least one of a thermal effect, a production of light, or a transmission of power. The method can also include causing, by the at least one processor, the device to perform the action.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems of a handheld device with accelerometer. The various concepts introduced above and discussed in greater detail below may be implemented in any of numerous ways.

The present disclosure is generally directed to one or more components of a handheld device. The components can include at least one sensor, at least one accelerometer, at least one body, at least one element, and at least one data processing system. The sensor and the accelerometer with communicate with the data processing system. The data processing system can control the element based on communication with the sensor and the accelerometer.

The elements can include at least one heating element and at least one light source. The elements can communicate with the data processing system. For example, the data processing system can provide control signals to elements. The control signals can cause the elements to perform one or more actions. For example, the control signals can cause the elements to produce heat.

The sensor and the accelerometer can be disposed or located within the body of the device. The location of the sensor and the accelerometer can insult or seal the body from the external environment (e.g., water, dust, dirt, debris). The inclusion of the sensor and the accelerometer provides for the removal of buttons or external control mechanism. The removal of the external control mechanism provides for a simpler assembly process as the body does not have any holes, openings, or apertures to receive the external control mechanisms. The removal of the holes further insults the body from the external environment.

Other devices with accelerometers can be limited in the number of actions or protocols that can be performed by the devices. The other devices also suffer from accidental or unintentional activation. Both of which can result in energy waste as energy is consumed without a user intended for the device to be activated.

Some technical solutions of the present disclosure include providing a device with an accelerometer and a sensor to detect human contact and movement patterns of a body of the device. Implementation of sensor feedback along with accelerometer feedback can reduce or eliminate accidental activation of the device responsive to a twostep process of activating the device. Further, the utilization of internal control components can result in a fully insulated device as the body of the device is without any holes or openings. This can protect the device from water, dust, dirt, or debris.

Figure 1:
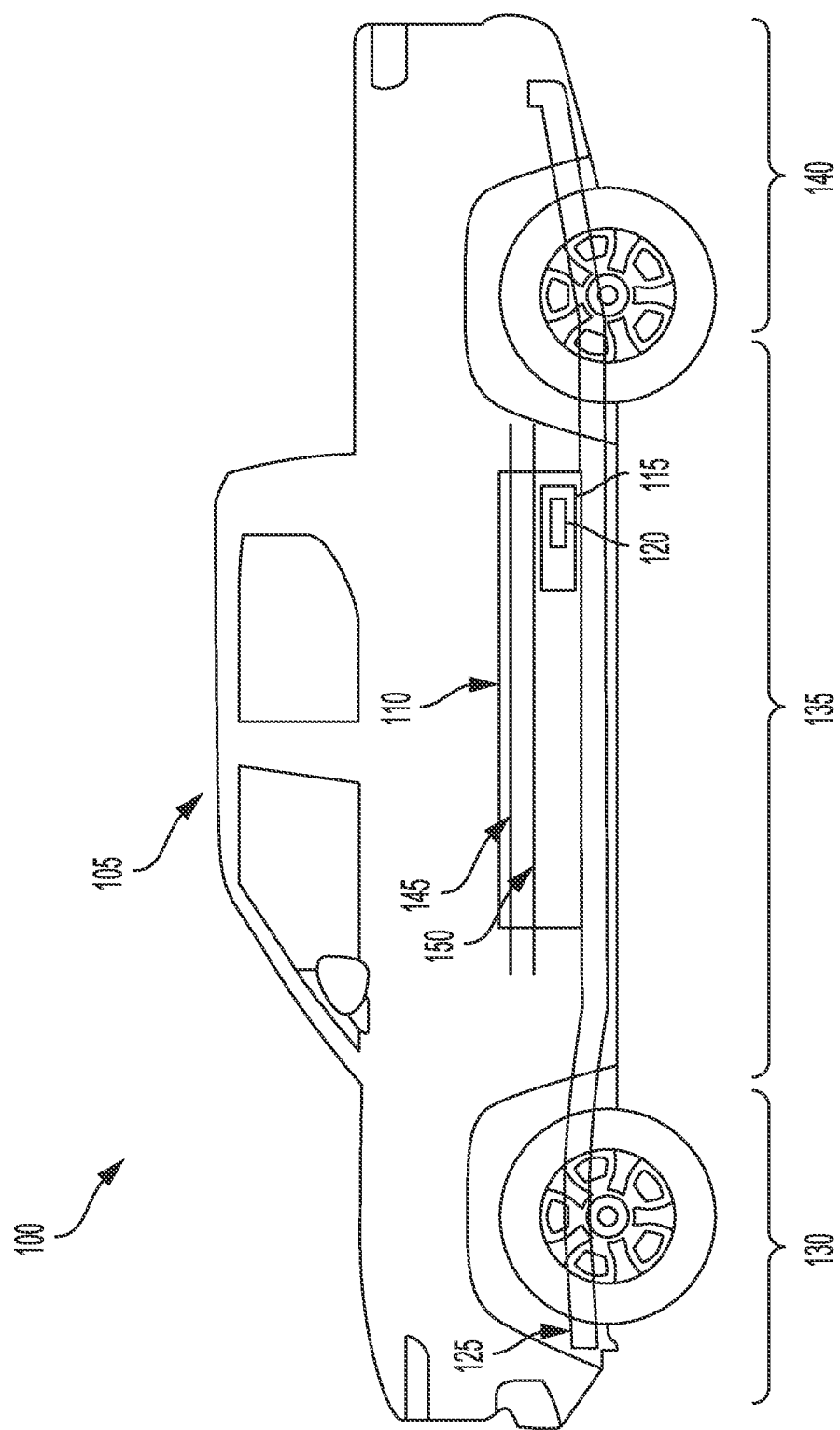
FIG. 1 depicts an electric vehicle, in accordance with an implementation.

FIG. 1 depicts an example cross-sectional view 100 of a vehicle such as an electric vehicle 105 that can include at least one battery pack 110. Vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The vehicle 105 can also include an internal combustion engine vehicle. The battery pack 110 can also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 110, batteries 115 or battery modules 115, or battery cells 120 to power the electric vehicles. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery 115, the battery modules 115, or the battery cells 120 with other electrical components of the electric vehicle 105 to provide electrical power to various systems or components of the electric vehicle 105.

Figure 2:
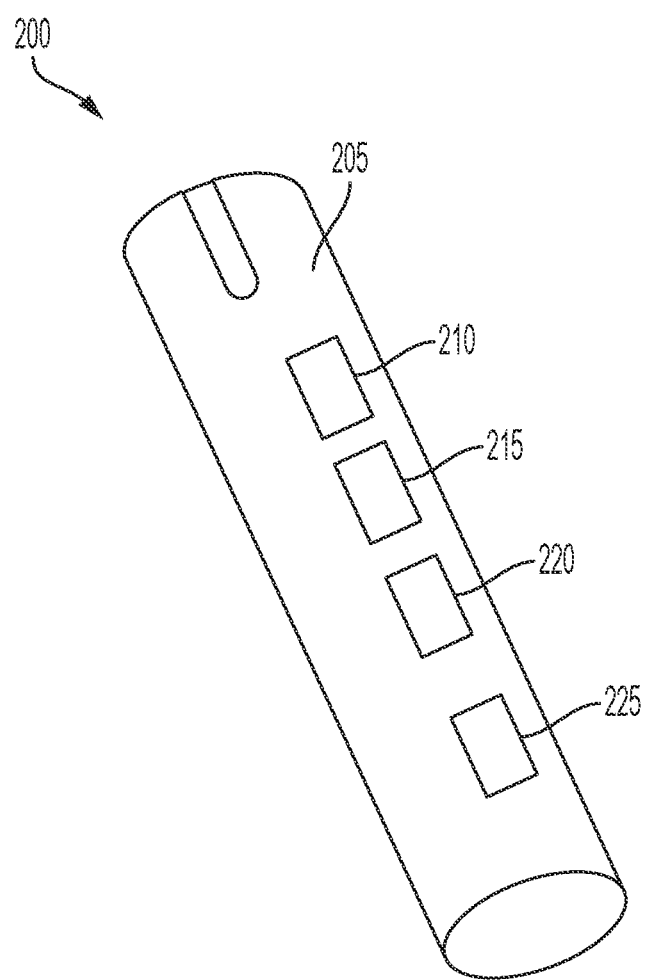
FIG. 2 depicts a perspective view of a device, in accordance with an implementation.

FIG. 2 depicts a perspective view of a device 200, in accordance with an implementation. The device 200 can include the device described herein. The device 200 can refer to or include at least one of handheld devices, wands, power banks, assemblies, modules, or other compact devices. The device 200 can be included with or provided with the vehicle 105. For example, the device 200 can be stored or located within a compartment of the vehicle 105. As another example, the device 200 can be stored within a door of the vehicle 105. The device 200 can be located in at least one of a glove box, a recess, a center console, a trunk, a vehicle bed, or a wall of the vehicle 105.

The device 200 can interface, interact, or otherwise communicate with at least one of component of the vehicle 105. For example, the device 200 can electrically couple with the batteries 115 of the vehicle 105. The device 200 can receive electric power from the batteries 115. One or more batteries or energy storage devices of the device 200 can be charged by the batteries 115. For example, an edge portion of the door can include a slot, a port, or a cavity to receive the device 200. To continue this example, the cavity of the edge portion of the door can electrically couple the device 200 to the batteries 115. The device 200 can receive power, from the batteries 115, to charge one or more energy storage devices (e.g., batteries) of the device 200. The device 200 can produce or provide at least one of heat, light, or power. For example, the device 200 can include a handwarmer. As another example, the device 200 can include a flashlight. As another example, the device 200 can include a power bank. The device 200 can be used to defrost one or more elements, components, or portions of the vehicle 105. For example, the device 200 can be used to defrost a windshield of the vehicle 105. As another example, the device 200 can be used to defrost a door handle of the vehicle 105.

The device 200 can include at least one body 205 at least one data processing system 220. The data processing system 220 can include at least one processor and memory. The data processing system 220 can be in communication with at least one component of the device 200. The device 200 can also include at least one sensor 210 and at least one accelerometer 215. The sensor 210 can include the sensor described herein. The sensor 210 can include one or more sensors. For example, the sensor 210 can include a first sensor and a second sensor. The sensor 210 can include at least one of a heat sensor, a tactile sensor, a capacitive touch sensor, a proximity sensor, or a resistive touch sensor. The sensor 210 can detect at least one of human contact or physical contact, such as contact with a windshield, a headlamp, a turn signal, a taillight, among various other parts of a vehicle. For example, the sensor 210 can detect when a human or person has made contact with the device 200. As another example, the sensor 210 can detect when a human is holding the body 205.

The accelerometer 215 can detect one or more movement patterns. For example, the accelerometer 215 can detect movement patterns of the body 205. The accelerometer 215 can detect movement of the body 205 through space. For example, the accelerometer 215 can detect movement of the body 205 across one or more planes. The accelerometer 215 can also detect orientation or placement of the body 205. For example, the body 205 can include a first side and a second side. To continue this example, the first side can define a top side and the second side can define a bottom side. Furthermore, the accelerometer 215 can detect when the body 205 is in an upward or downwards position. While the sensor 210 and the accelerometer 215 have been described herein as separate or distinct components, the device 200 may include one or more components that perform the functionality of the sensor 210 or the accelerometer 215. For example, the device 200 may include a first component that performs the functionality of the sensor 210 and the accelerometer 215.

The data processing system 220 can communicate with the sensor 210 and the accelerometer 215. For example, the data processing system 220 can determine (e.g., receive, detect, or obtain) one or more signals from the sensor 210 or the accelerometer 215. The signals can provide one or more indications. For example, the sensor 210 can provide one or more signals, to the data processing system 220, to indicate detection of human contact. As another example, the accelerometer 215 can provide one or more signals to the data processing system 220 to indicate detection of a movement pattern.

The data processing system 220 can determine one or more actions. For example, the data processing system 220 can determine actions that correspond to the movement patterns of the body 205. As another example, a first movement pattern can correspond to a first action and a second movement pattern can correspond to a second action. The movement patterns can include at least one of moving, repositioning, rotating, spinning, reorientating, or otherwise manipulating the placement of the body 205. The data processing system 220 can cause the device 200 to perform one or more actions. For example, the data processing system 220 can cause the device 200 to perform an action that corresponds to the movement patterns detected by the accelerometer 215.

The device 200 can include at least one element 225. The element 225 can include at least one of the elements described herein. For example, the device 200 can include a first element 225 and a second element 225. As another example, the device 200 can also include a third element 225. As even another example, the device 200 can include a single element 225 that can perform at least one of the various actions described herein. The first element 225 can include a thermal element (e.g., a heating element or a cooling element). The first element 225 can be in communication with the data processing system 220. The first element 225 can determine (e.g., receive, obtain, or act responsive to) one or more signals from the data processing system 220. For example, the first element 225 can receive control signals from the data processing system 220. The first element 225 can perform one or more actions responsive to receiving the signals. For example, the first element 225 can produce a thermal effect, such as a production of heat (e.g., an action) responsive to receiving one or more signals from the data processing system 220.

The second element 225 can include a light source. The second element 225 can be in communication with the data processing system 220. The second element 225 can receive one or more signals from the data processing system 220. For example, the second element 225 can receive control signals from the data processing system 220. The second element 225 can perform one or more actions responsive to receiving the signals. For example, the second element 225 can produce light (e.g., an action) responsive to receiving one or more signals from the data processing system 220.

The third element 225 can include one or more energy storage devices. For example, the third element 225 can include batteries. The third element 225 can transmit power. For example, the third element 225 can include a power bank. The third element 225 can transmit power to one or more devices. For example, the third element 225 can transmit power to a mobile device. The third element 225 can receive one or more signals from the data processing system 220. For example, the third element 225 can receive control signals to cause the third element 225 to transmit power. The third element 225 can electrically couple with the vehicle 105. For example, the third element 225 can electrically couple with the batteries 115 to receive power to charge or recharge the third element 225 (e.g., the batteries).

In some embodiments, the accelerometer 215 can detect one or more movements, specific movements, a combination of movement, gestural movements, or movement patterns. For example, the accelerometer 215 can detect a movement pattern that corresponds to adjusting an amount of heat that is produced by the first element 225. The sensor 210 can detect subsequent human contact with the body 205. The subsequent human contact can correspond to adjusting the actions performed by the device 200. For example, detection of human contact at a first point of the body 205 can indicate a request to provide additional light by the second element 225.

The data processing system 220 can store one or more movement patterns in memory. For example, the data processing system 220 can store a list of movement patterns of the body 205. The data processing system 220 can also store one or more actions performable by the device 200. For example, the data processing system 220 can store a list of actions that the elements 225 can perform. The data processing system 220 can link the movement patterns with the actions. For example, the device 200 can include a programming or configuration protocol that includes contacting various portions of the body 205 and contacting a given portion of the body 205 can link one or more movement patterns with one or more actions.

The data processing system 220 can also communicate with one or more devices. For example, the data processing system 220 can communicate with a mobile device. As another example, the data processing system 220 can communicate with the infotainment system of the vehicle 105. The data processing system 220 can receive one or more indications from the devices. For example, the data processing system 220 can receive an indication to associate a given action with a given movement pattern. The data processing system 220 can store, in memory, the linkage of the given action with the given movement pattern. The data processing system 220 can cause the device 200 to provider one or more types of feedback. For example, the data processing system 220 can cause the device 200 to provide haptic feedback. As another example, the data processing system 220 can cause the second element 225 to flash a light. The feedback provided by the device 200 indicate association of the given action with the given movement pattern.

Figure 3:
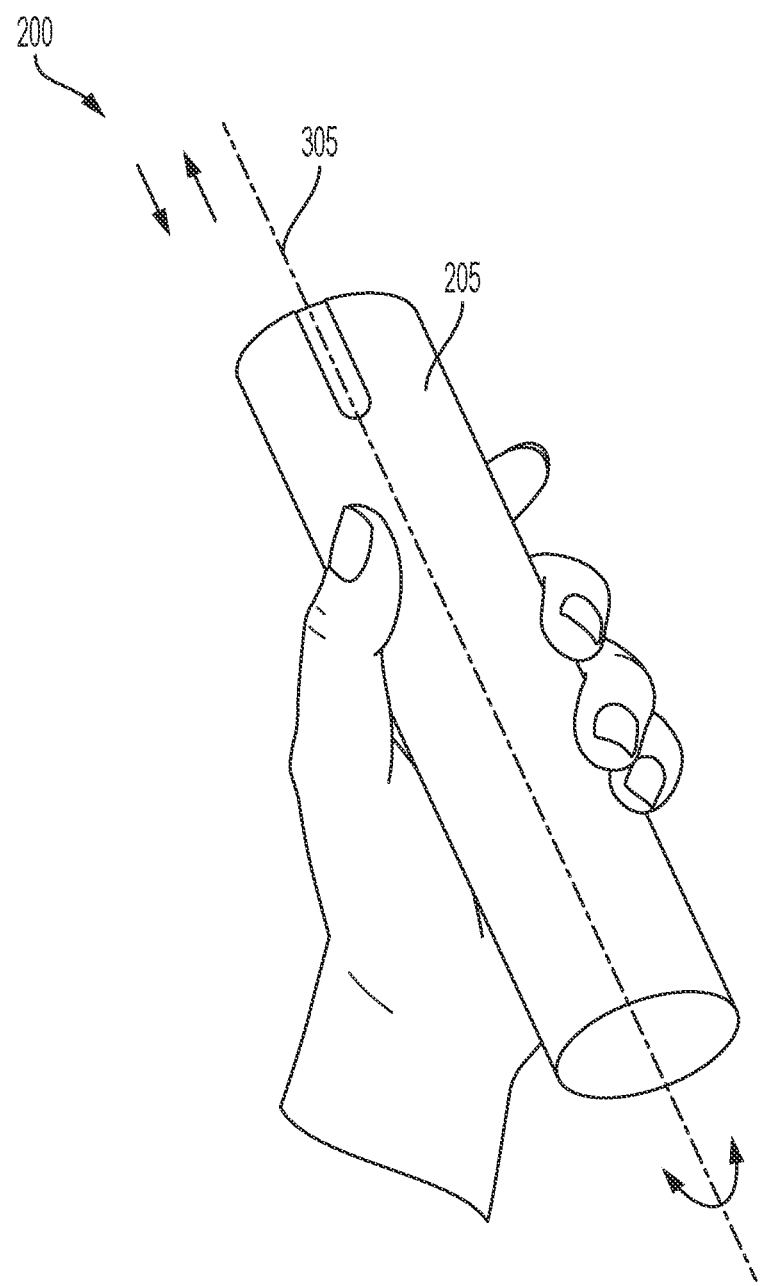
FIG. 3 depicts a perspective view of the device illustrated in FIG. 2, in accordance with an implementation.

FIG. 3 depicts a perspective view of the device 200, in accordance with an implementation. The device 200 can define or occupy at least one plane 305. As shown in FIG. 3, the plane 305 intersects a center portion of the device 200. The body 205 can rotate, move, reposition, adjust, or otherwise move about, around, or across the plane 305. The body 205 can move about one or more planes. For example, the body 205 can move about a first plane 305 and a second plane 305. The body 205 can move about the first plane 305 by rotating around the first plane 305. The body 205 can move about the second plane 305 by pivoting, hinging, or otherwise swinging about the second plane 305. The path taken by the body 205 while moving about the planes 305 can indicate the action or the movement pattern. FIG. 3 shows an example of the device 200 being held by a hand.

Figure 4:
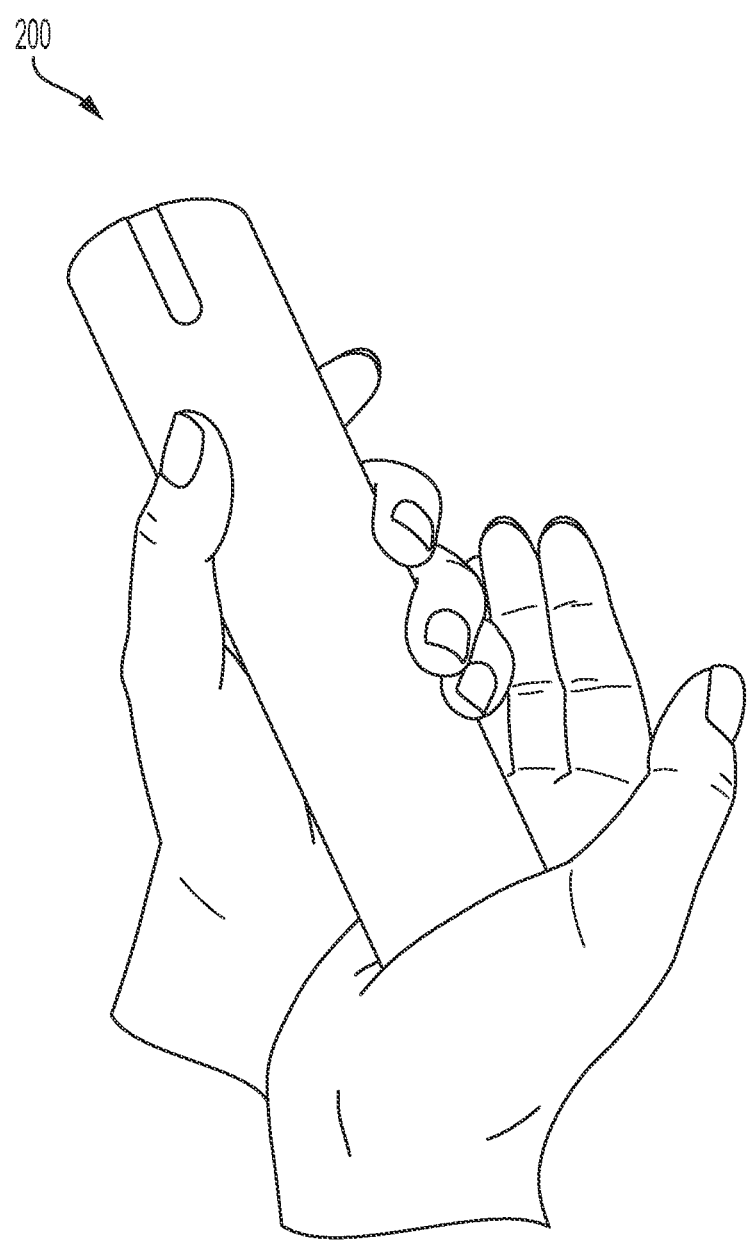
FIG. 4 depicts a perspective view of the device illustrated in FIG. 2, in accordance with an implementation.

FIG. 4 depicts a perspective view of the device 200, in accordance with an implementation. FIG. 4 depicts an example of the device 200 in contact with two hands. As shown in FIG. 4, the device 200 is being held by a first hand and the body 205 is in contact with a palm of a second hand. The device 200 being held by the first hand and the body 205 being in contact with the second hand can represent a movement pattern. For example, the operator of the device 200 can swing, move, or position the device 200 to have the body 205 contact the second hand and by having the body 205 contact the second hand the accelerometer 215 can detect a movement pattern.

Figure 5:
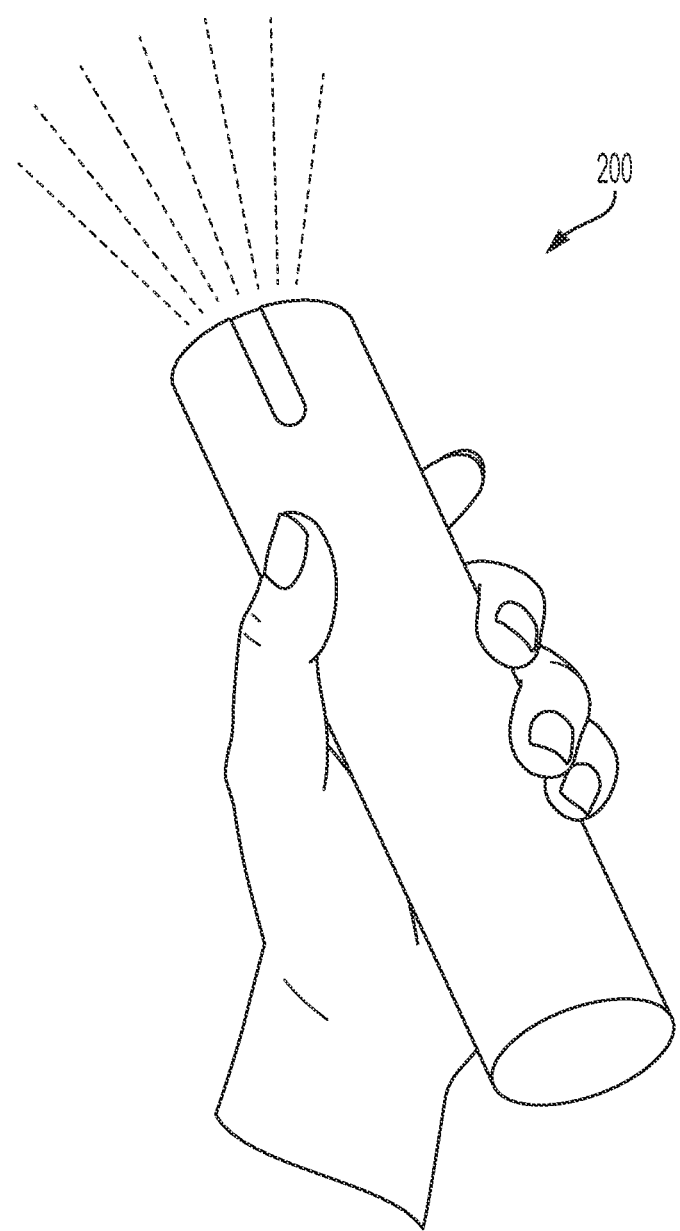
FIG. 5 depicts a perspective view of the device illustrated in FIG. 2, in accordance with an implementation.

FIG. 5 depicts a perspective view of the device 200, in accordance with an implementation. FIG. 5 depicts an example of the device 200 producing light (e.g., performing an action). The device 200 can produce light responsive to the data processing system 220 providing one or more signals to the elements 225. The data processing system 220 can provide the signals to the elements 225 responsive to the accelerometer 215 detecting a movement pattern that is associated with light production (e.g., an action).

Figure 6:
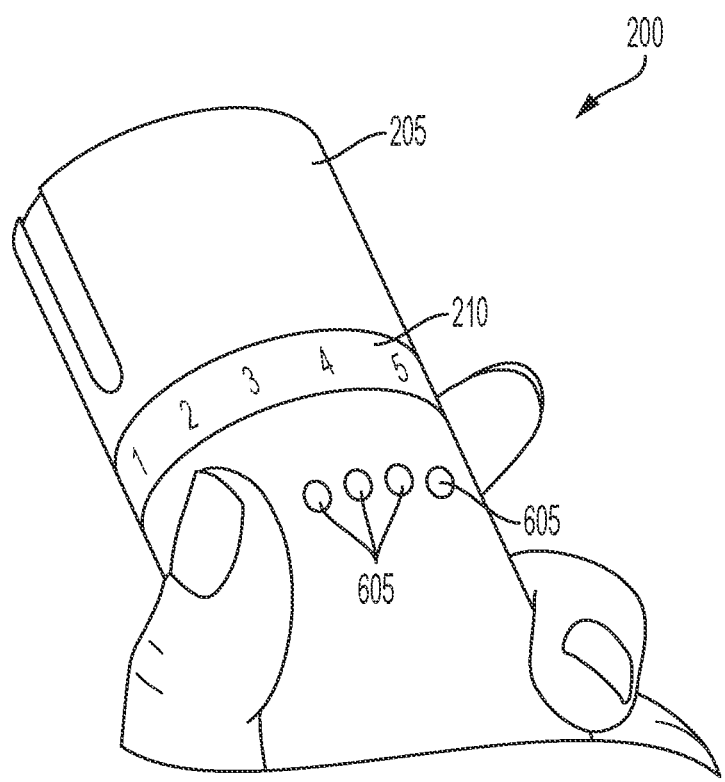
FIG. 6 depicts a perspective view of the device illustrated in FIG. 2, in accordance with an implementation.

FIG. 6 depicts a perspective view of the device 200, in accordance with an implementation. The sensor 210 can be disposed on or across an external surface of the body 205. The sensor 210 can include one or more segments (shown as 1, 2, 3, 4, and 5 in FIG. 6). The sensor 210 can detect human contact with one or more of the segments. For example, the sensor 210 can detect human contact with a first segment of the sensor 210. The data processing system 220 can cause the device 200 to adjust one or more actions to reflect the human contact with the segments of the sensor 210. For example, the data processing system 220 can cause the device 200 to adjust an amount of heat that is produced by the elements 225. As another example, the data processing system can cause the device 200 to adjust an amount of light that is produced by the elements 225.

The device 200 can include at least one light source 605. For example, the device 200 can include at least one Light Emitting Diodes (LEDs). The light sources 605 can produce light. For example, the light sources 605 can produce light to indicate one or more actions of the device. The light sources 605 can produce light having one or more colors. For example, the light sources 605 can produce light having a first color to indicate a first action of the device 200. As another example, the light sources 605 can produce light having a second color to indicate a second action of the device 200. The light sources 605 can produce light having one or more patterns. For example, the light sources 605 can flash, strobe, and/or blink. As another example, the light sources 605 can include a first light source 605 and a second light source 605. To continue this example, production of light, by the first light source 605, can indicate a first action of the device 200 and production of light, by the second light source 605, can indicate a second action of the device 200. As another example, and as shown in FIG. 6, the device 200 can include four light sources 605 and illumination (e.g., production of light) of the four light sources 605 can be adjusted, changed, modified, or altered to produce one or more patterns. To continue this example, a first light source 605 (of the four light sources 605) can produce light at a first point in time and halt production of light at a second point in time, and a second light source 605 (of the four light sources 605) can produce light at the second point in time. Stated otherwise, the four light sources 605 can turn on or off (relative to one another) to produce at least one of a scrolling pattern, a sliding pattern, or a directional pattern of light.

Figure 7A:
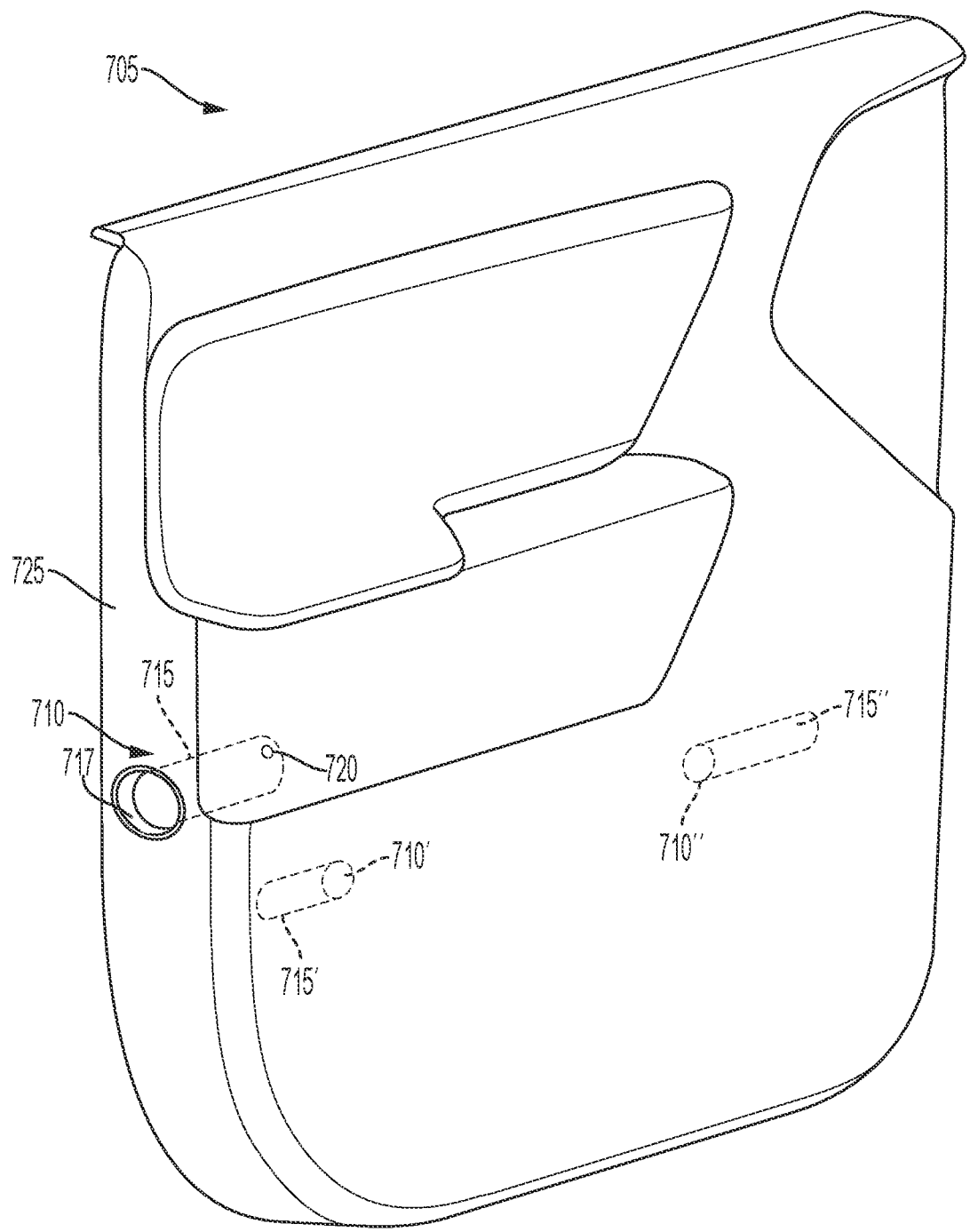
FIG. 7A depicts a perspective view of a vehicle door including a cavity to receive the device illustrated in FIG. 2, in accordance with an implementation.

FIG. 7A depicts a perspective view of a vehicle door 705. The vehicle 105 can include the vehicle door 705. For example, the vehicle door 705 can be a driver side door of the vehicle 105. The vehicle door 705 can include at least one compartment assembly 710. The compartment assembly 710 can include at least one cavity 715. The cavity 715 can define or establish a body. For example, the cavity 715 can define a recess to receive the device 200. As another example, the device 200 can be inserted into and/or placed within the cavity 715. The compartment assembly 710 can electrically couple the device 200 with the batteries 115. For example, the compartment assembly 710 can include at least one pin 720. The pin 720 can be inserted into an opening of the device 200. The pin 720 can electrically couple the device 200 with the batteries 115. For example, electrical power can be provided, from the batteries 115, to the device 200 via the pins 720. The compartment assembly 710 can also include an opening 717 to receive at least a portion of the device 200. For example, the opening 717 can receive at least a portion of the body 205.

While the compartment assembly 710, as shown in FIG. 7, is located proximate to an edge portion 725 of the vehicle door 705, the compartment assembly 710 can be located in one or more spots or areas of the vehicle door 705. For example, the compartment assembly 710 can be located or disposed within a trim panel of the vehicle door 705. As another example, the compartment assembly 710 can be located or disposed within a map pocket of the vehicle door 705.

Figure 7B:
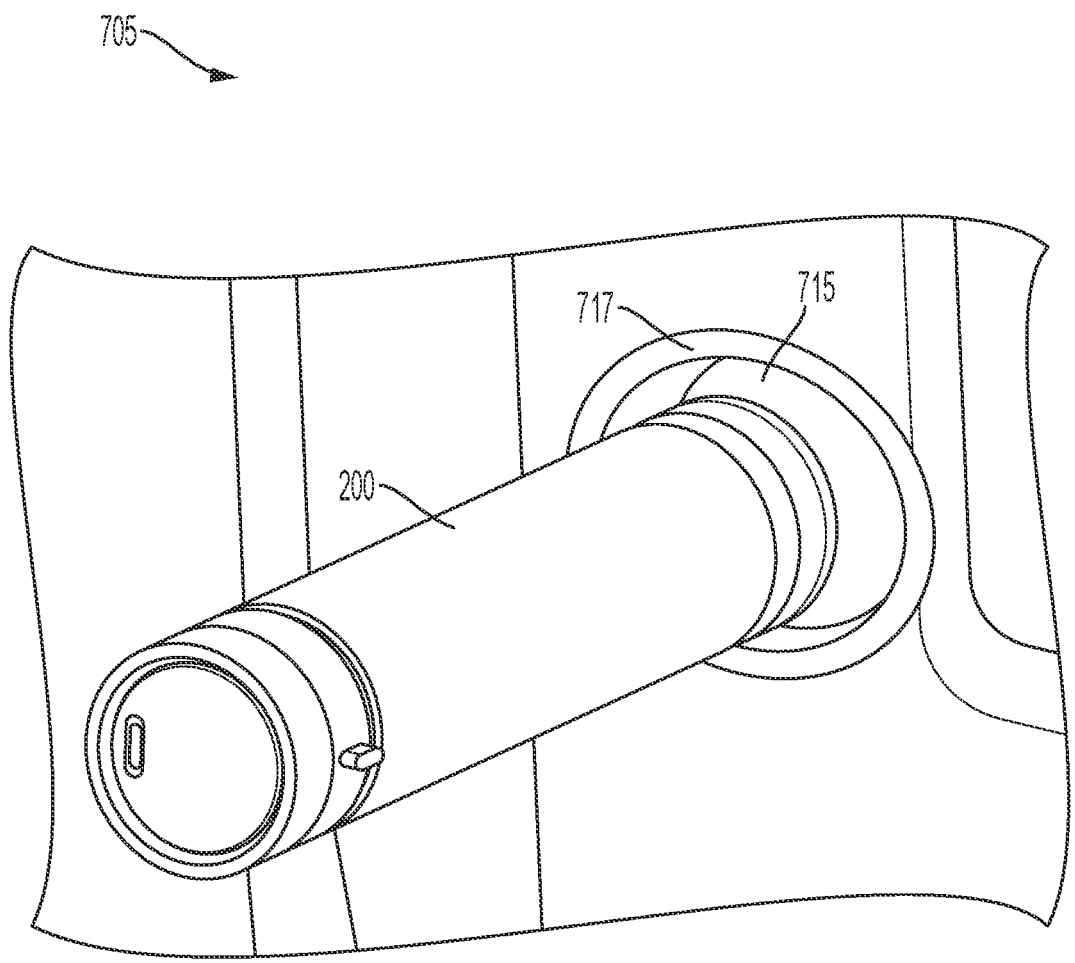
FIG. 7B depicts a perspective view of the vehicle door illustrated in FIG. 7A, in accordance with an implementation.

FIG. 7B depicts a perspective view of the vehicle door 705. The device 200 can be inserted into the compartment assembly 710. For example, the device 200 can be inserted into or within the cavity 715. The device 200 can be inserted at least partially within the compartment assembly 710. For example, a first portion of the device 200 can be located within the cavity 715, with the device inserted into the compartment assembly 710, and a second portion of the device 200 can be located external to the cavity 715 with the device 200 inserted into the compartment assembly 710. As shown in FIG. 7B, the opening 717 has received at least a portion of the body 205 as the device 200 is inserted into the cavity 715. The opening 717 can guide or direct the body 205 as the device 200 is inserted into the cavity 715.

Figure 7C:
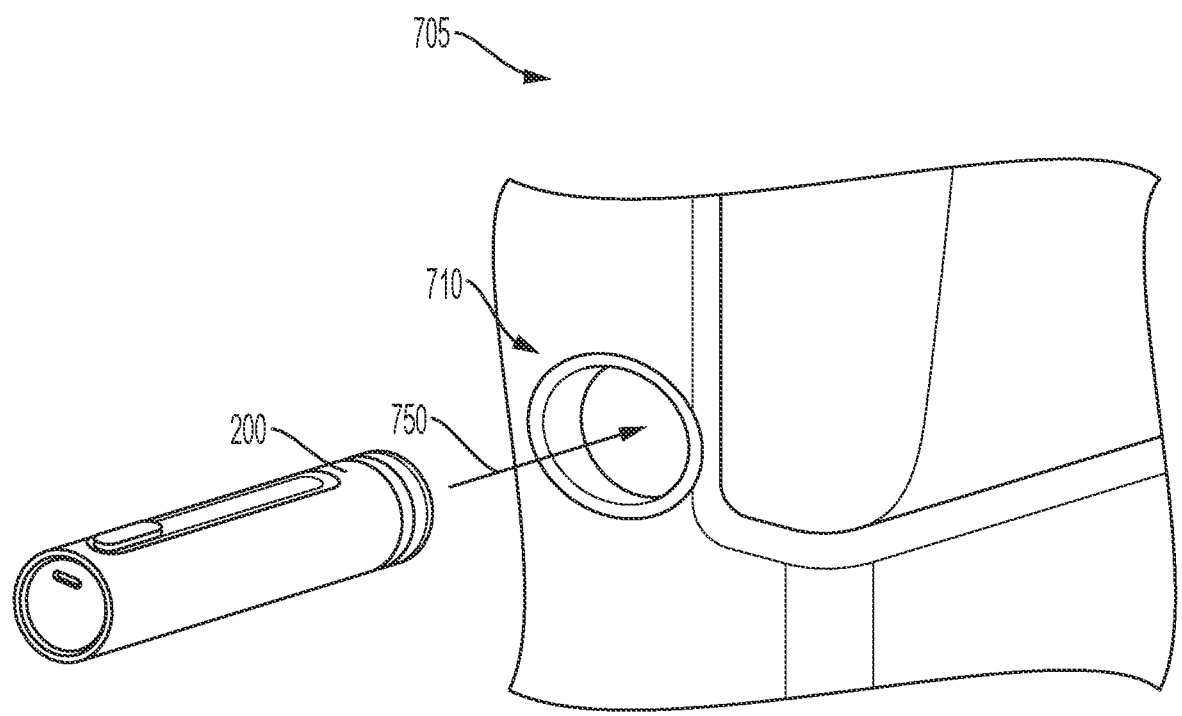
FIG. 7C depicts a perspective view of the vehicle door illustrated in FIG. 7A, in accordance with an implementation.
Figure 7D:
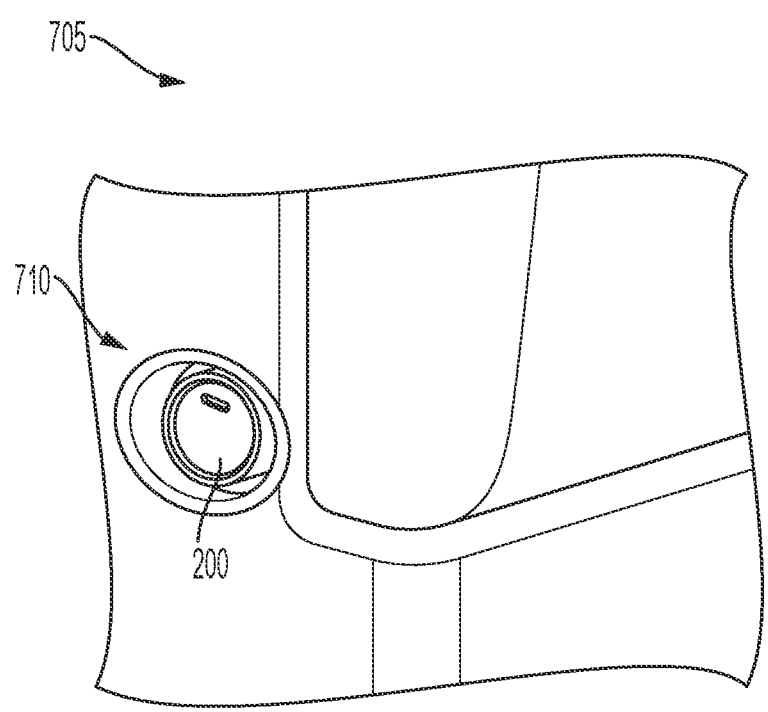
FIG. 7D depicts a perspective view of the vehicle door illustrated in FIG. 7A, in accordance with an implementation.
Figure 7E:
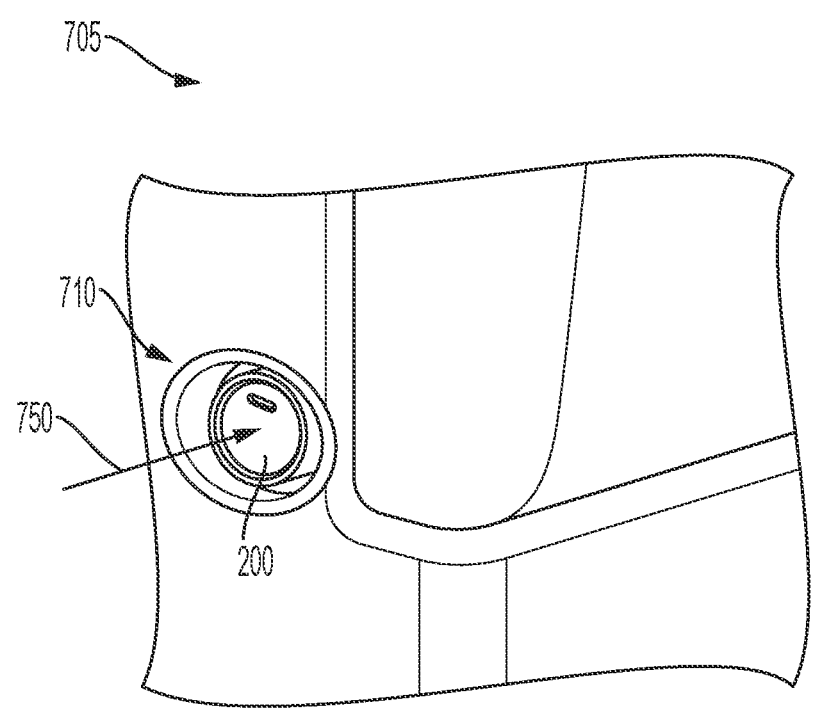
FIG. 7E depicts a perspective view of the vehicle door illustrated in FIG. 7A, in accordance with an implementation.

FIGS. 7C-7G depict perspective views of the vehicle door 705. The device 200 can be inserted into the compartment assembly 710. For example, the device 200 can move towards the compartment assembly 710 to be inserted into the cavity 715. As shown in FIG. 7C, the device 200 can move in direction 750 to be inserted into the compartment assembly 710. As shown in FIG. 7D, the device 200 can rest in the cavity 715 responsive to being inserted into the compartment assembly 710. The device 200 can be coupled with the vehicle 105 with the device inserted into the compartment assembly 710. The device 200 can be spring loaded or pressure loaded inserted into the compartment assembly 710. For example, an operator of the vehicle 105 or the device 200 can apply a force, in the direction 750, on the device 200 to cause the device to move out from the cavity 715. As another example, the device 200 can at least partially exit the cavity 715 responsive to an application of force on the device 200. As shown in FIG. 7E, an application of a force, in the direction 750, on the device 200 can cause a spring or gas device to release or move the device 200 from within the cavity 715.

Figure 7F:
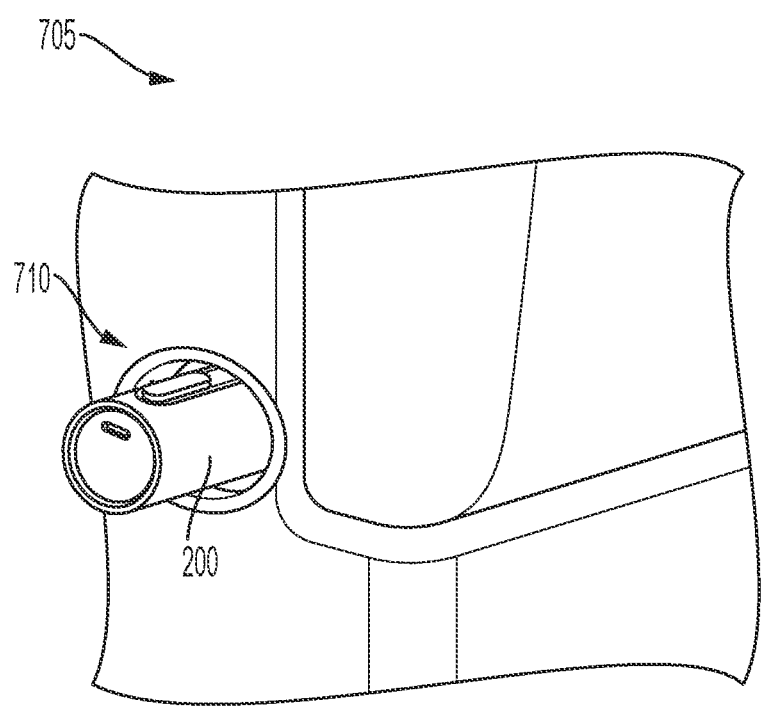
FIG. 7F depicts a perspective view of the vehicle door illustrated in FIG. 7A, in accordance with an implementation.
Figure 7G:
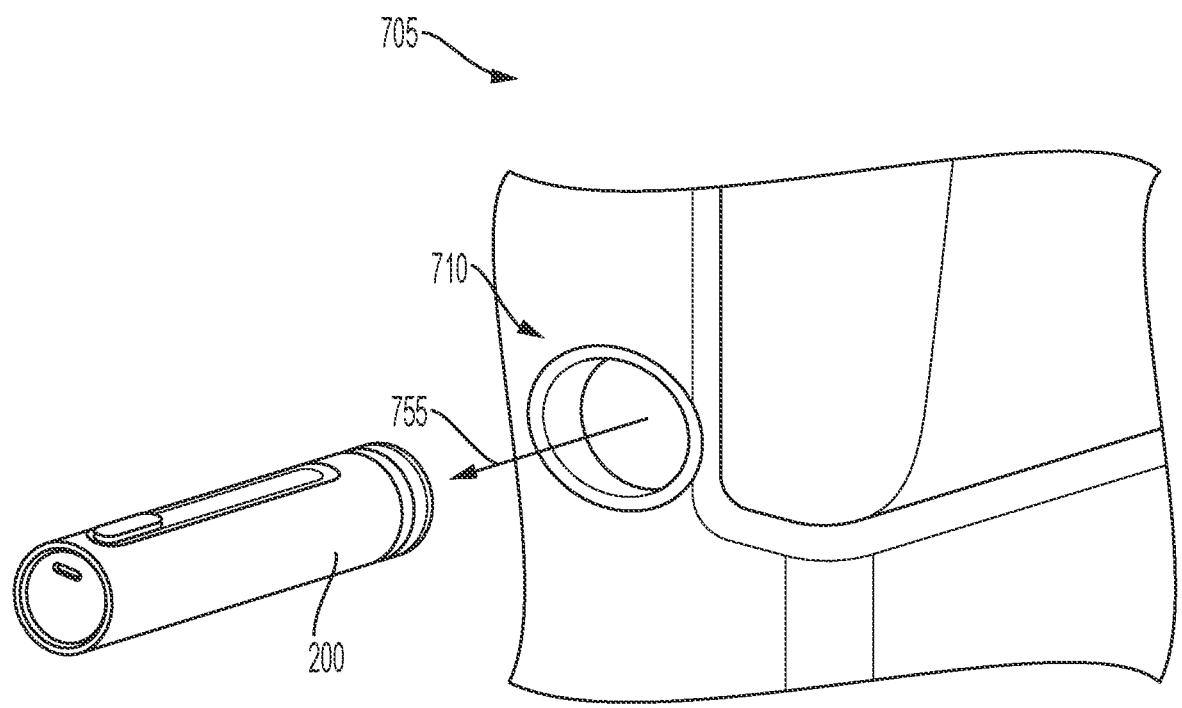
FIG. 7G depicts a perspective view of the vehicle door illustrated in FIG. 7A, in accordance with an implementation.

As shown in FIG. 7F, the device 200 has been released responsive to an application of a force on the device 200. The device 200 can exit or leave the compartment assembly 710 responsive to the device 200 having been released from the compartment assembly 710. The device 200 can move in direction 755 to leave or exit the compartment assembly 710. For example, an operator of the device 200 can move the device 200 in the direction 755 to remove the device 200 from the compartment assembly 710. As shown in FIG. 7G, the device 200 can move in the direction 755 to move away from the compartment assembly 710.

Figure 8:
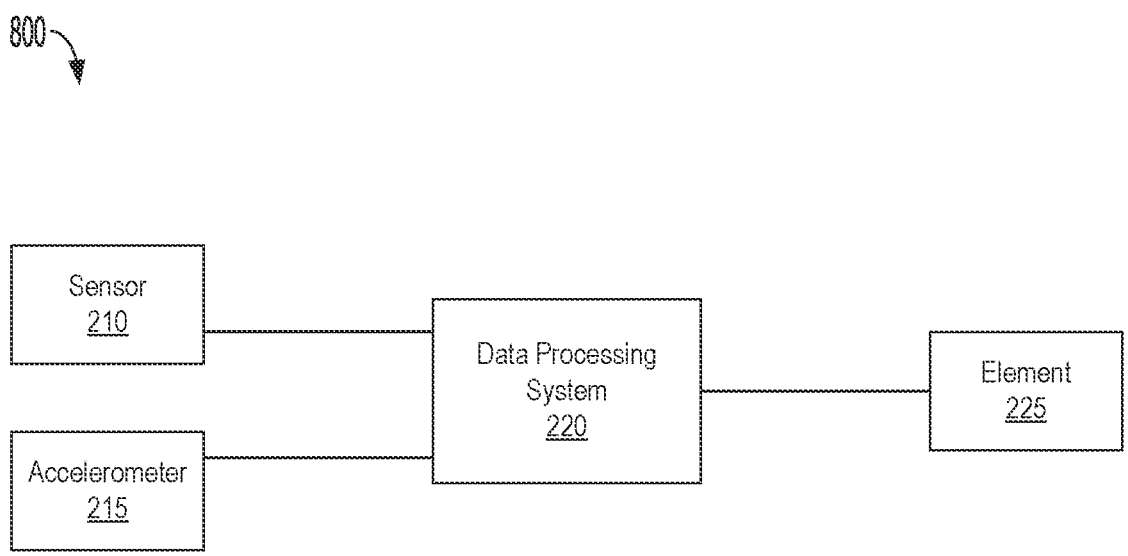
FIG. 8 depicts a block diagram of a system including one or more components of the device illustrated in FIG. 2, in accordance with an implementation.

FIG. 8 depicts a block diagram a system 800, in accordance with an implementation. The system 800 can include the sensor 210, the accelerometer 215, the data processing system 220, and the element 225. The data processing system 220 can be in communication with the sensor 210, the accelerometer 215, and the element 225. The data processing system 220 can provide signals to the sensor 210, the accelerometer 215, and the element 225. The data processing system 220 can also provide indirect communication between the sensor 210 and the element 225, the sensor 210 and the accelerometer 215, and the accelerometer 215 and the element 225.

Figure 9:
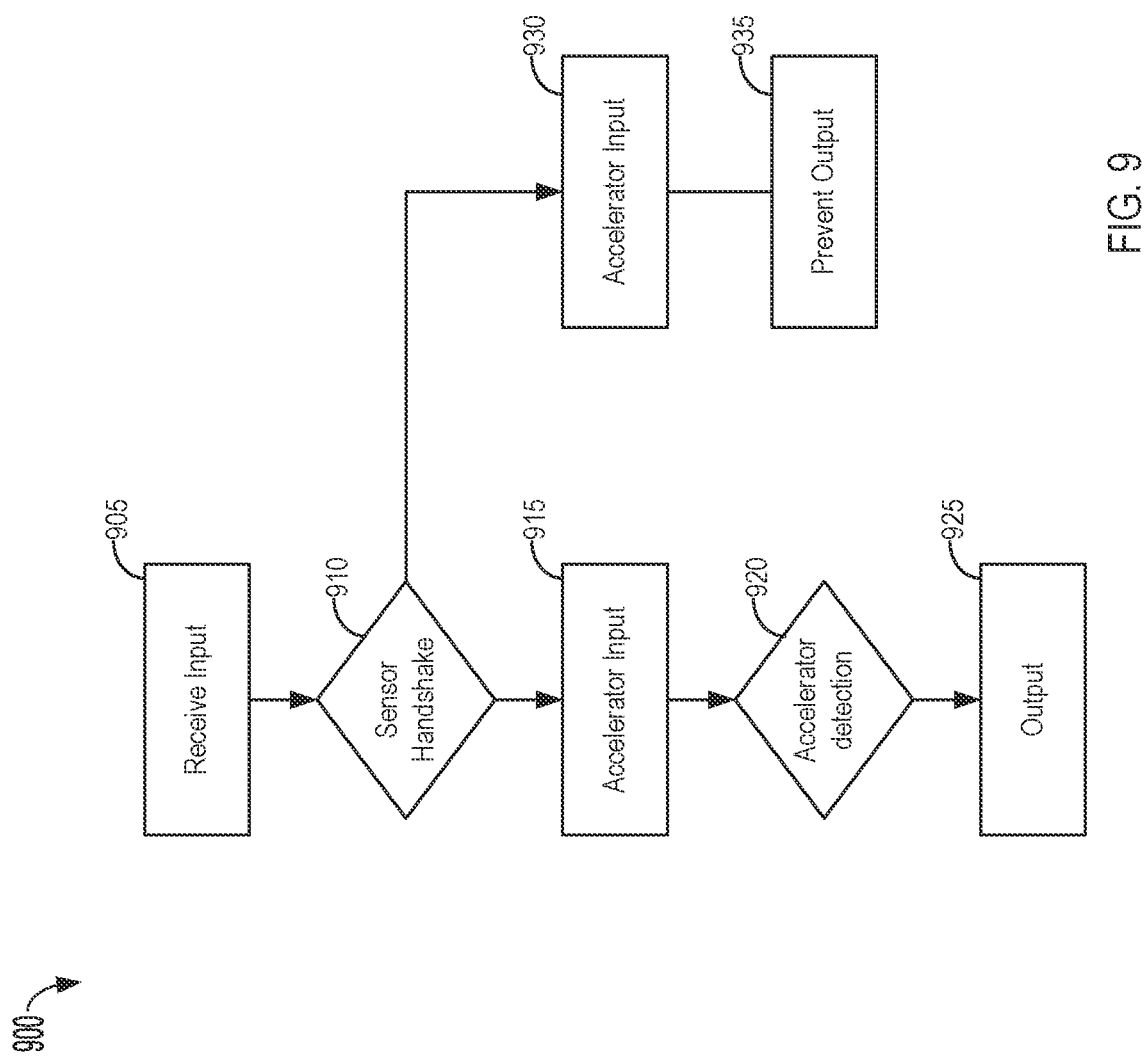
FIG. 9 depicts a flow chart of a process to control the device illustrated in FIG. 2, in accordance with an implementation.

FIG. 9 depicts a flow chart of a process 900 to control the device illustrated in FIG. 2, in accordance with an implementation. At least one step of the process 900 can be performed by at least one of the systems, devices, or components described herein. For example, the system 800 can perform at least one of the steps of the process 900.

At act 905, an input can be received. For example, the sensor 210 can detect human contact with the body 205. The sensor 210 can receive the input responsive to an operator of the device 200 interacting with, interfacing with, or otherwise contacting the body 205. At act 910, a determination as to whether there is a sensor handshake protocol established for the device 200 can be made. For example, the data processing system 220 can determine that one or more handshake protocols have been established for the device 200. The handshake protocols can include communication protocols between the sensor 210 and the data processing system 220. The process 900 can proceed to act 915 responsive to a determination that there is a handshake protocol. The process 900 can proceed to act 930 responsive to a determination that there is not a handshake protocol.

At act 915, input from the accelerometer 215 can be received. For example, the data processing system 220 can receive one or more signals from the accelerometer 215. The signals can include indications of one or more detected movement patterns. At act 920, a determination as to whether the signals received in act 915 included movement patterns can be made. The process 900 can proceed to act 925 responsive to a determination that the signals received in act 920 included movement patterns. At act 925, one or more outputs can be transmitted. For example, the data processing system 220 can transmit one or more signals to the elements 225 to cause the elements 225 to perform one or more actions.

At act 930, input from the accelerometer 215 can be received. The data processing system 220 can receive the input responsive to the accelerometer 215 transmitting one or more signals. At act 935, an output can be prevented. For example, the data processing system 220 can forego transmitting one or more signals to the elements 225. The data processing system 220 can forego transmitting of the signals responsive to the determination in act 910 that there was not a handshake protocol between the sensor 210 and the data processing system 220.

Figure 10:
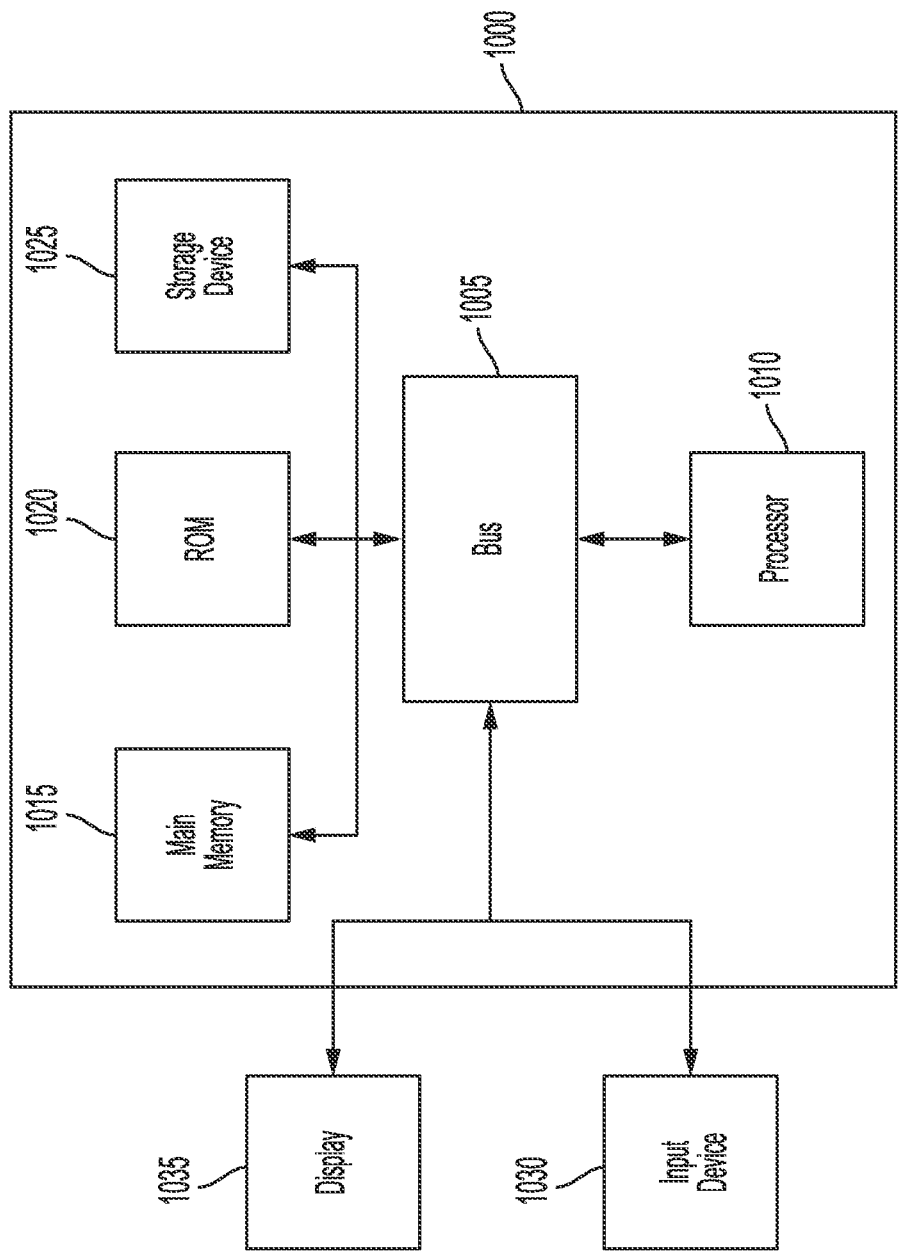
FIG. 10 is a block diagram illustrating an architecture for a computer system that can be employed to implement elements of the systems and methods described and illustrated herein.

FIG. 10 depicts an example block diagram of an example computer system 1000. The computer system or computing device 1000 can include or be used to implement a data processing system or its components. The computing system 1000 includes at least one bus 1005 or other communication component for communicating information and at least one processor 1010 or processing circuit coupled to the bus 1005 for processing information. The computing system 1000 can also include one or more processors 1010 or processing circuits coupled to the bus for processing information. The computing system 1000 also includes at least one main memory 1015, such as a random access memory (RAM) or other dynamic storage device, coupled to the bus 1005 for storing information, and instructions to be executed by the processor 1010. The main memory 1015 can be used for storing information during execution of instructions by the processor 1010. The computing system 1000 may further include at least one read only memory (ROM) 1020 or other static storage device coupled to the bus 1005 for storing static information and instructions for the processor 1010. A storage device 1025, such as a solid state device, magnetic disk or optical disk, can be coupled to the bus 1005 to persistently store information and instructions.

The computing system 1000 may be coupled via the bus 1005 to a display 1035, such as a liquid crystal display, or active matrix display, for displaying information to a user such as a driver of the electric vehicle 105 or other end user. An input device 1030, such as a keyboard or voice interface may be coupled to the bus 1005 for communicating information and commands to the processor 1010. The input device 1030 can include a touch screen display 1035. The input device 1030 can also include a cursor control, such as a mouse, a trackball, or cursor direction keys, for communicating direction information and command selections to the processor 1010 and for controlling cursor movement on the display 1035.

The processes, systems and methods described herein can be implemented by the computing system 1000 in response to the processor 1010 executing an arrangement of instructions contained in main memory 1015. Such instructions can be read into main memory 1015 from another computer-readable medium, such as the storage device 1025. Execution of the arrangement of instructions contained in main memory 1015 causes the computing system 1000 to perform the illustrative processes described herein. One or more processors in a multi-processing arrangement may also be employed to execute the instructions contained in main memory 1015. Hard-wired circuitry can be used in place of or in combination with software instructions together with the systems and methods described herein. Systems and methods described herein are not limited to any specific combination of hardware circuitry and software.

Although an example computing system has been described in FIG. 10, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C #, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A device, comprising:
    a body including a sensor and an accelerometer;
        the sensor to detect that the body is being held; and
        the accelerometer to detect a movement of the body; and
    at least one processor configured to:
        determine, responsive to the sensor detecting the body as being held, an action corresponding to the movement of the body, the action comprising at least one of a thermal effect, a production of light, or a transmission of power; and
        cause, responsive to the determination of the action, the device to perform the action.

2. The device of claim 1, wherein the action comprises the thermal effect which includes a production of heat, comprising:
    a thermal element in communication with the at least one processor; and
    the thermal element configured to:
        determine, from the at least one processor, a first signal; and
        perform, responsive to receipt of the first signal, the action including the production of heat.

3. The device of claim 1, wherein the action comprises the production of light, comprising:
    a light source in communication with the at least one processor; and
    the light source configured to:

determine, from the at least one processor, a first signal; and perform, responsive to receipt of the first signal, the action comprising the production of light.

4. The device of claim 1, wherein the movement of the body includes at least a portion of the body moving about a first plane and a second plane, and wherein a path of the at least a portion of the body taken while moving about the first plane and the second plane indicates the action.

5. The device of claim 1, comprising:
the at least one processor configured to:
store a plurality of movements of the body, the plurality of movements of the body including the movement of the body;
store a plurality of actions performable by the device; and
link, responsive to a detection of a contact with the body, a given action of the plurality of actions to a given movement of the plurality of movements.

6. The device of claim 1, comprising:
the sensor disposed across an external surface of the body;
the sensor including a plurality of segments; and
the sensor configured to detect a contact with a given segment of the plurality of segments; and
the at least one processor configured to:
cause, based on the contact with the given segment, the device to adjust the action to reflect the contact with the given segment.

7. The device of claim 1, wherein subsequent detection of contact with the body causes the device to adjust at least one of an amount of heat produced by the device or an amount of light produced by the device.

8. The device of claim 1, comprising:
the at least one processor configured to:
receive, from a first device, an indication to associate a second action with a second movement of the body; and
cause the device to provide feedback to indicate association of the second action with the second movement of the body.

9. The device of claim 1, wherein the device is storable within an edge portion of a door of a vehicle, and wherein the device is configured to electrically couple with a power source of the vehicle to charge one or more energy storage devices of the device.

10. At least one processor and memory in communication with a sensor and an accelerometer, and the at least one processor and memory configured to:
determine, from the sensor including a plurality of segments, a first indication of a detection that a body of a device is being held based on detection of contact with a first segment of the plurality of segments;
determine, from the accelerometer, responsive to the detection that the body of the device is being held, a second indication of a detection of a movement of the body;
determine an action corresponding to the movement of the body, the action comprising at least one of a thermal effect, a production of light, or a transmission of power; and
cause, responsive to the determination of the action, the device to perform the action.

11. The at least one processor and memory of claim 10, wherein the action comprises the thermal effect which includes a production of heat, and wherein the device includes:

a thermal element in communication with the at least one processor and memory; and
the thermal element configured to:
determine, from the at least one processor and memory, a first signal; and
perform, responsive to receipt of the first signal, the action including the production of heat.

12. The at least one processor and memory of claim 10, wherein the action comprises the production of light, and wherein the device includes:
a light source in communication with the at least one processor and memory; and
the light source configured to:
determine, from the at least one processor and memory, a first signal; and
perform, responsive to receipt of the first signal, the action comprising the production of light.

13. The at least one processor and memory of claim 10, wherein the movement of the body includes at least a portion of the body moving about a first plane and a second plane, and wherein a path of the at least a portion of the body taken while moving about the first plane and the second plane indicates the action.

14. The at least one processor and memory of claim 10, configured to:
store a plurality of movements of the body, the plurality of movements including the movement of the body;
store a plurality of actions performable by the device; and
link, responsive to a detection of a contact with the body, a given action of the plurality of actions to a given movement of the plurality of movements.

15. The at least one processor and memory of claim 10, wherein:
the sensor is disposed across an external surface of the body; and
the sensor is configured to detect a contact with a given segment of the plurality of segments; and
the at least one processor and memory configured to:
cause, based on the contact with the given segment, the device to adjust the action to reflect the contact with the given segment.

16. The at least one processor and memory of claim 10, wherein subsequent detection of contact with the body causes the device to adjust at least one of an amount of heat produced by the device or an amount of light produced by the device.

17. A method, comprising:
detecting, by a sensor of a device, that a body of the device is being held;
detecting, by an accelerometer of the device, a movement of the body;
determining, by at least one processor, responsive to the sensor detecting the body as being held, an action corresponding to the movement of the body, the action comprising at least one of a thermal effect, a production of light, or a transmission of power; and
causing, by the at least one processor, responsive to determining the action, the device to perform the action.

18. The method of claim 17, wherein the action comprises the thermal effect which includes a production of heat, comprising:
determining, by a thermal element of the device, from the at least one processor, a first signal; and
performing, by the thermal element, responsive to receipt of the first signal, the action including the production of heat.

19. The method of claim 17, wherein the action comprises the production of light, comprising:
- determining, by a light source of the device, from the at least one processor, a first signal; and
- performing, by the light source, responsive to receipt of the first signal, the action comprising the production of light.

20. The method of claim 17, comprising:
- storing, by the at least one processor, a plurality of movements of the body, the plurality of movements including the movement of the body;
- storing, by the at least one processor, a plurality of actions performable by the device; and
- linking, by the at least one processor, responsive to a detection of a contact of the body, a given action of the plurality of actions to a given movement of the plurality of movements.

\* \* \* \* \*